United States Patent
Goff

(10) Patent No.: US 6,934,898 B1
(45) Date of Patent: Aug. 23, 2005

(54) TEST CIRCUIT TOPOLOGY RECONFIGURATION AND UTILIZATION TECHNIQUES

(75) Inventor: Lonnie C. Goff, Tempe, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 543 days.

(21) Appl. No.: 09/997,784

(22) Filed: Nov. 30, 2001

(51) Int. Cl.⁷ .............................................. G01R 31/28
(52) U.S. Cl. ...................................... 714/727; 714/729
(58) Field of Search ..................... 713/320; 710/312, 710/72; 711/187; 702/117; 714/727, 729

(56) References Cited

U.S. PATENT DOCUMENTS

| | | | |
|---|---|---|---|
| 5,483,518 A | | 1/1996 | Whetsel |
| 5,590,354 A | | 12/1996 | Klapproth et al. |
| 5,640,521 A | | 6/1997 | Whetsel |
| 5,724,505 A | | 3/1998 | Argade et al. |
| 5,781,560 A | | 7/1998 | Kawano et al. |
| 5,862,152 A | | 1/1999 | Handly et al. |
| 5,915,083 A | | 6/1999 | Ponte |
| 5,928,374 A | | 7/1999 | Shimizu et al. |
| 5,935,266 A | | 8/1999 | Thurnhofer et al. |
| 5,996,081 A | * | 11/1999 | Shim .......................... 713/320 |
| 6,018,815 A | | 1/2000 | Baeg |
| 6,055,656 A | | 4/2000 | Wilson, Jr. et al. |
| 6,078,979 A | * | 6/2000 | Li et al. ....................... 710/312 |
| 6,115,763 A | * | 9/2000 | Douskey et al. ............... 710/72 |
| 6,142,683 A | | 11/2000 | Madduri |
| 6,158,032 A | | 12/2000 | Currier et al. |
| 6,175,914 B1 | | 1/2001 | Mann |
| 6,185,732 B1 | | 2/2001 | Mann et al. |
| 6,189,140 B1 | | 2/2001 | Madduri |
| 6,202,172 B1 | | 3/2001 | Ponte |
| 6,363,464 B1 | * | 3/2002 | Mangione .................... 711/167 |
| 6,625,559 B1 | * | 9/2003 | Helder ........................ 702/117 |
| 2001/0010083 A1 | | 7/2001 | Satoh |
| 2001/0034598 A1 | | 10/2001 | Swoboda |

OTHER PUBLICATIONS

Whetsel, L., "An IEEE 1149.1 Based Test Access Architecture for ICS with Embedded Cores", Jul. 1997, Conf. 28, New York, NY USA.

* cited by examiner

*Primary Examiner*—David Ton
(74) *Attorney, Agent, or Firm*—Peter Zawilski

(57) ABSTRACT

Among the embodiments of the present invention is a technique that includes executing a first protocol on test bus (40) in accordance with an established test standard to operate a first topology of several test ports (70) and activating to a shadow controller (60) by executing a second protocol on test bus (40). Operation of the test ports (70) is suspended during execution of the second protocol. During activation, the shadow controller (60) can be used to set-up a second topology of one or more of test ports (70) for operation after the test port suspension is discontinued.

28 Claims, 6 Drawing Sheets

--BUS ALERT SEQUENCE--

TEST CIRCUIT TOPOLOGY RECONFIGURATION AND UTILIZATION TECHNIQUES

BACKGROUND

The present invention relates to electronic devices, and more particularly, but not exclusively, relates to utilization of test circuitry for debugging operations and the ability to reconfigure test circuit topology.

Testing of electronic circuit boards and corresponding component connections can be performed with a so-called "bed of nails" tester. Typically, this type of tester includes probes to contact selected electrical nodes and generate test signals to verify proper electrical continuity and isolation. With the advent of circuit boards having multiple conductive layers and more complex integrated circuit devices, bed of nails testers have often proved inadequate.

One effort to provide better testing of circuitry resulted in the Joint Test Action Group (JTAG) creation of IEEE/ANSI standard 1149.1. As used herein, "JTAG standard" refers to the latest revision of the IEEE/ANSI standard 1149.1 in effect on or before 1 Nov. 2001. The JTAG standard is based on a test bus that includes at least four signal lines: a Test Data Output (TDO) line, a Test Data Input (TDI) line, a Test Mode Select (TMS) line, and a Test Clock (TCK) line. The JTAG test bus may optionally include a fifth line for Test Logic Reset (TRST). The JTAG test bus is arranged to communicate with JTAG compliant Test Access Ports (TAPs) embedded in the circuitry to be tested. Several TAPs can be utilized in a given device under test that each have a corresponding TDO interface and TDI interface. The TDO interface of one TAP can be connected to the TDI interface of another TAP to form a serially connected chain. Test equipment can be connected to the test bus to exercise the device under test, with the TDO bus line connected to the unconnected TDI interface of the TAP at one end of the chain and the TDI bus line connected to the TDO interface of the TAP at the other end of the chain to form a serially interconnected communication ring.

In contrast, the TMS and TCK bus lines are provided to each of the TAPs in parallel. The JTAG standard defines a finite state machine synchronized by with the test clock signal TCK. The various states of this machine facilitate the communication of data or commands to the TAPs through the chain, such that a boundary scan operation can be performed. The sequence of JTAG states are provided as a function of the state of TMS relative to the number of cycles TCK has run.

With the continued increase in circuit complexity, including, but not limited to the development of "System on a Chip" (SoC) technology, it has become desirable to include many TAPs on a circuit device, and possibly in the same integrated circuit. Indeed, SoC devices typically include memory, one or more processors, and other logic that would be desirable to test. For these complex technologies, the ability to single-out circuitry associated with only one TAP or to serially concatenate less than all available TAPs can be useful in the performance of various debug operations. To conserve chip space and/or reduce or eliminate the need for debug-dedicated interconnections, there is frequently a preference to perform debug operations with existing test architecture, such as the JTAG bus and TAPs.

One attempt to utilize existing test architecture for the JTAG standard is based on the JTAG by-pass command. While this command may be used to isolate a selected TAP; it does so by hampering the restoration of instruction registers in other TAPs. In another attempt, a TAP linking module has been proposed that selectively addresses subordinate TAPs. Unfortunately, this linking module scheme requires that address information be appended to standard JTAG communication packets by the host equipment, preventing backwards compatibility. As a consequence, an additional linking module override I/O pin has been proposed. Such modifications are problematic in many instances.

Thus, there is a need for further contributions in this area of technology. The present invention addresses this need.

SUMMARY

One embodiment of the present invention is a unique technique for utilizing test circuitry. Other embodiments of the present invention include unique devices, methods, systems, and apparatus to test circuitry and/or debug device operation.

A further embodiment of the present invention includes halting a test clock to suspend operation of several test ports; operating a shadow controller while the test ports are suspended; and resuming operation of one or more of the test ports after said operating.

In another embodiment of the present invention, an apparatus includes a test bus, several test ports each including a controller, and a shadow controller coupled between the test bus and the test ports. The test ports are each operable in accordance with an established test standard during a first mode of operation. The shadow controller includes a storage device to store information corresponding to a selection of one or more of the test ports during a second mode of operation. The test ports are inactive during the second mode of operation. The one or more of the test ports selected with the information operate in accordance with the established test standard upon return to the first mode of operation.

Still another embodiment includes a processor-readable device encoded with processor instructions that are executable to perform a boundary scan test through a scan chain of several test access ports in accordance with an established test bus protocol. The instructions are further executable to suspend a test clock signal, store information in a shadow controller to define a different configuration of the test access ports, and operate the different configuration of the test access ports in accordance with the established test bus protocol.

Yet a further embodiment of the present invention includes: providing a device responsive to a test clock signal that includes a number of test ports arranged in a first configuration; suspending operation of the test ports; defining a second configuration of the test ports during the suspension; and operating the device in accordance with the second configuration.

One object of the present invention is to provide a unique technique for utilizing test circuitry.

Another object of the present invention is to provide a unique device, method, system, or apparatus to test circuitry and/or debug device operation.

Further objects, embodiments, forms, features, benefits, and advantages of the present invention shall become apparent from the description and figures included herewith.

DETAILED DESCRIPTION OF SELECTED EMBODIMENTS

Figure 1:
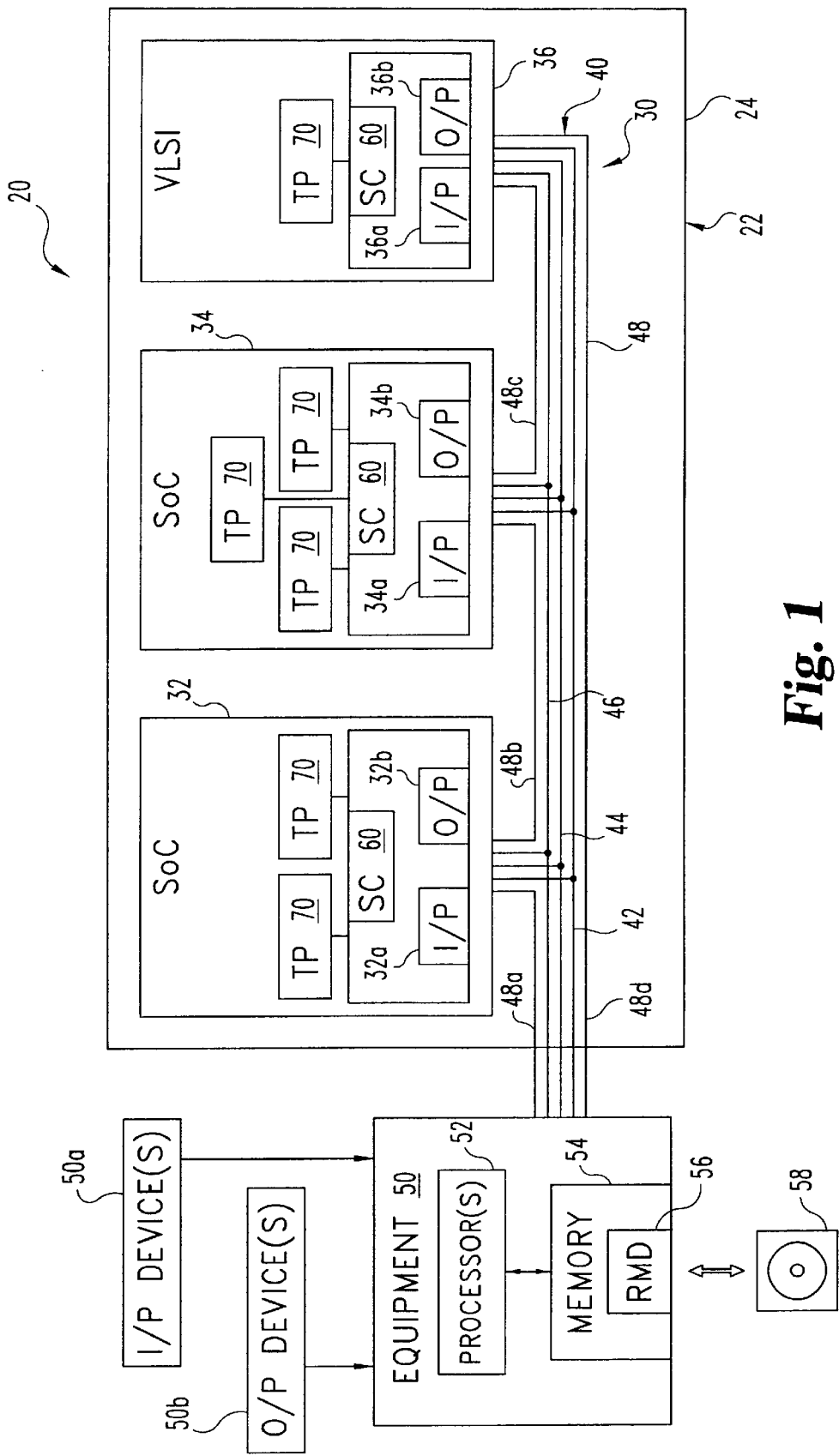
FIG. 1 is a diagrammatic view of a system of one embodiment of present invention.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 depicts system 20 of one embodiment of the present invention. System 20 includes circuit device 22. Circuit device 22 includes printed wiring board 24 carrying a number of integrated circuit components 30. Components 30 include System-on-Chip (SoC) device 32, SoC device 34, and Very Large Scale Integration (VLSI) circuit device 36. Components 30 can include one or more other devices (not shown) and/or can include different devices than those shown as would occur to those skilled in the art.

Components 30 are operatively coupled to test bus 40. Test bus 40 includes parallel test clock bus line 42, test mode select bus line 44, and test logic reset bus line 46, corresponding to the TCK, TMS, and TRST signals, respectively, of the JTAG standard. Test bus 40 also includes serial scan chain 48. Chain 48 includes the Test Data Out (TDO) bus line 48a which is provided to test data input (I/P) 32a of SoC device 32. Chain 48 also includes serial test data line 48b interconnecting test data output (O/P) 32b of SoC device 32 to test data input 34a of SoC device 34 and serial test data line 48c interconnecting test data output 34b of SoC 34 to test data input 36a of circuit device 36. Chain 48 also includes Test Data Input (TDI) bus line 48d connected to test data output 36b.

Test bus lines 42, 44, 46, 48a and 48d are connected to bus master equipment 50. Equipment 50 includes one or more operator input (I/P) device(s) 50a and one or more operator output (O/P) device(s) 50b. Input device(s) 50a can include a conventional mouse, keyboard, trackball, light pen, voice recognition subsystem, and/or different input device type as would occur to those skilled in the art. Output device(s) 50b can include a conventional graphic display, such as a color or noncolor plasma, Cathode Ray Tube (CRT), or Liquid Crystal Display (LCD) type; color or noncolor printer; aural output system; and/or different output device type as would occur to those skilled in the art. Further, in other embodiments, more or fewer operator input device(s) 50a or operator output device(s) 50b may be utilized.

Equipment 50 also includes one or more processor(s) 52 operatively coupled to input device(s) 50a, output device(s) 50b, and memory 54. Processor(s) 52 are of a programmable type that can execute software programming instructions stored in at least a portion of memory 54. Equipment 50 includes one or more programs to control test bus 40 as a bus master under the JTAG standard, and provide signal emulation for testing in accordance with the JTAG standard. This programming further provides for the execution of routine 120, including a hidden, non-JTAG protocol, as more fully described in connection with FIG. 3 hereinafter.

Processor(s) 52 can be comprised of one or more integrated circuit components defining one or more Central Processor Units (CPUs). Processor(s) 52 can include appropriate supporting logic, analog devices, and power supply units. In one form, processor(s) 52 are based on at least one microprocessor of a standard variety. Embodiments including multiple processor(s) 52 can be provided in a common computing device, arranged to provide distributed processing from multiple units at different locations connected by a computer network, and/or in a different manner as would occur to one skilled in the art. In other embodiments some or all of the logic executed by processor(s) 52 in the form of software programming is replaced with firmware; dedicated digital and/or analog circuitry; and/or using such different techniques as would occur to one skilled in the art.

At least a portion of memory 54 is comprised of Removable Memory Device (RMD) 56. RMD 56 is of a nonvolatile type that can include a storage disk 58 as schematically represented in FIG. 1. Storage disk 58 can be of a magnetic type, such as a floppy disk or removable hard drive, or an optically read type, such as a Compact Disk (CD) or Digital Video Disk (DVD) to name just a few examples. In other embodiments, RMD 56 alternatively or additionally includes other portable memory types, such as a magnetic tape, cartridge, and/or nonvolatile semiconductor media. It should be appreciated that storage disk 58 and/or another form of RMD 56 can be used to store some or all of any software programming instructions to be executed with processor(s) 52 as an alternative or in addition to one or more other parts of memory 54. In still other embodiments, RMD 56 and/or disk 58 may be absent.

Besides RMD 56, memory 54 can be comprised one or more components of a solid-state, electronic type and additionally or alternatively may include another type, such as the magnetic or optical variety, to name just a few. For example, memory 54 may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); a mass memory in the form of an optically read disk (such as one or more CDs or DVDs) or a magnetically encoded disk (such as one or more hard disks or floppy disks); or a combination of any of these types. Also, memory 54 may be volatile, nonvolatile, or a combination of volatile and nonvolatile varieties.

Equipment 50 is illustrated as a host device separate from device 22 in FIG. 1. In one form, equipment 50 is a standard type of programmable host device that can be selectively interconnected to test bus 40 of device 22. In other embodiments, equipment 50 can be provided as part of device 22, as a dedicated device included with device 22 in a common unit, or in a different configuration as would occur to one skilled in the art. As used herein, TDO refers to the test data output by equipment 50 on test bus 40 and test data received at a test data input of any of components 30 via chain 48; and TDI refers to the test data input of equipment 50 from test bus 40 and test data provided by a test data output on chain 48 from any of components 30. Accordingly, a TDI signal from the test data output of one component 30 can be a TDO signal with respect to the test data input of another component 30.

Figure 2:
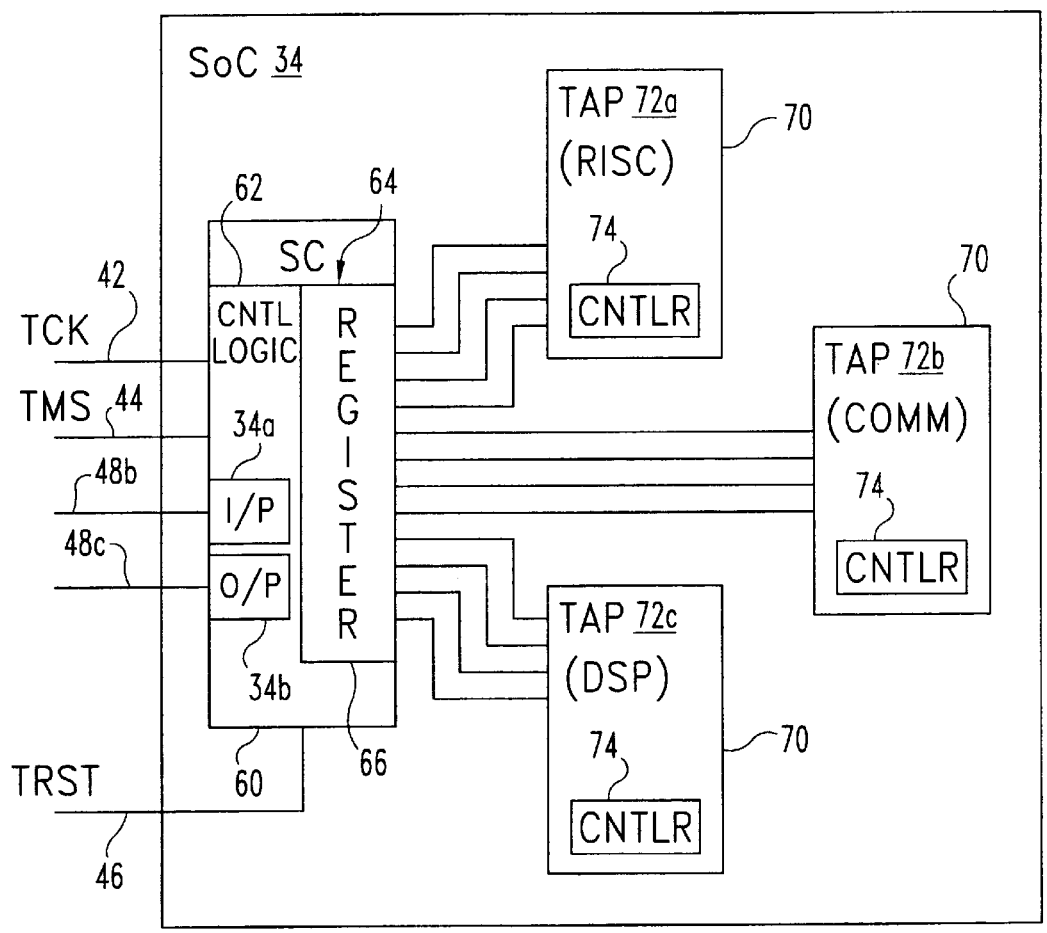
FIG. 2 is a diagrammatic view of a SoC of the system of FIG. 1 showing further details.

Each of the illustrated components 30 includes a corresponding Shadow controller (SC) 60 coupled between test bus 40 and at least one Test Port (TP) 70. Referring additionally to FIG. 2, SoC device 34 is illustrated in greater detail. SC 60 of SoC device 34 includes control (CNTL) logic 62 and data storage device 66 in the form of a test port map register 64. Logic 62 is arranged to provide a test controller and other registers to selectively operate as a Test Access Port (TAP) under the JTAG standard. Storage device 66 can be arranged to include such other registers and/or memory as required to provide SC 60 in the form of a JTAG TAP. Control logic 62 is coupled to test bus 40 and is configured to respond to various signal protocols communicated over test bus 40. Test data input (I/P) 34a and test data output (O/P) 34b, corresponding to TDO and TDI signals of the JTAG standard, are illustrated for SC 60 in FIG. 2.

SoC device 34 includes three test ports 70, that are each alternatively designated in FIG. 2 as a corresponding Test Access Port (TAP) 72a, 72b, and 72c. TAPs 72a, 72b, and 72c conform to the JTAG standard and are each dedicated to a different logical device of SoC 34. Specifically TAP 72a is provided to interface with a Reduced Instruction Set Computer (RISC) circuit, TAP 72b is provided to interface with a communication (COMM) circuit, and TAP 72c is provided to interface with a Digital Signal Processor (DSP) circuit. Each test port 70 includes a corresponding test controller 74 responsive to the JTAG standard signal protocol if received from test bus 40 via SC 60, and includes various registers and logic for operation as a TAP under the JTAG standard. TAPs 72a, 72b, and 72c are each subordinate to SC 60 of SoC device 34. SCs 60 are each coupled between test bus 40 and its corresponding TPs 70. For SoC device 32 there are two subordinate TPs 70, for SoC 34 there are three subordinate TPs 70, and for device 36, there is one subordinate TP 70. SC 60 of other of components 30 are configured the same as SC 60 of SoC device 34, and each TP 70 of other of components 30 are configured as a JTAG TAP.

Figure 3A:
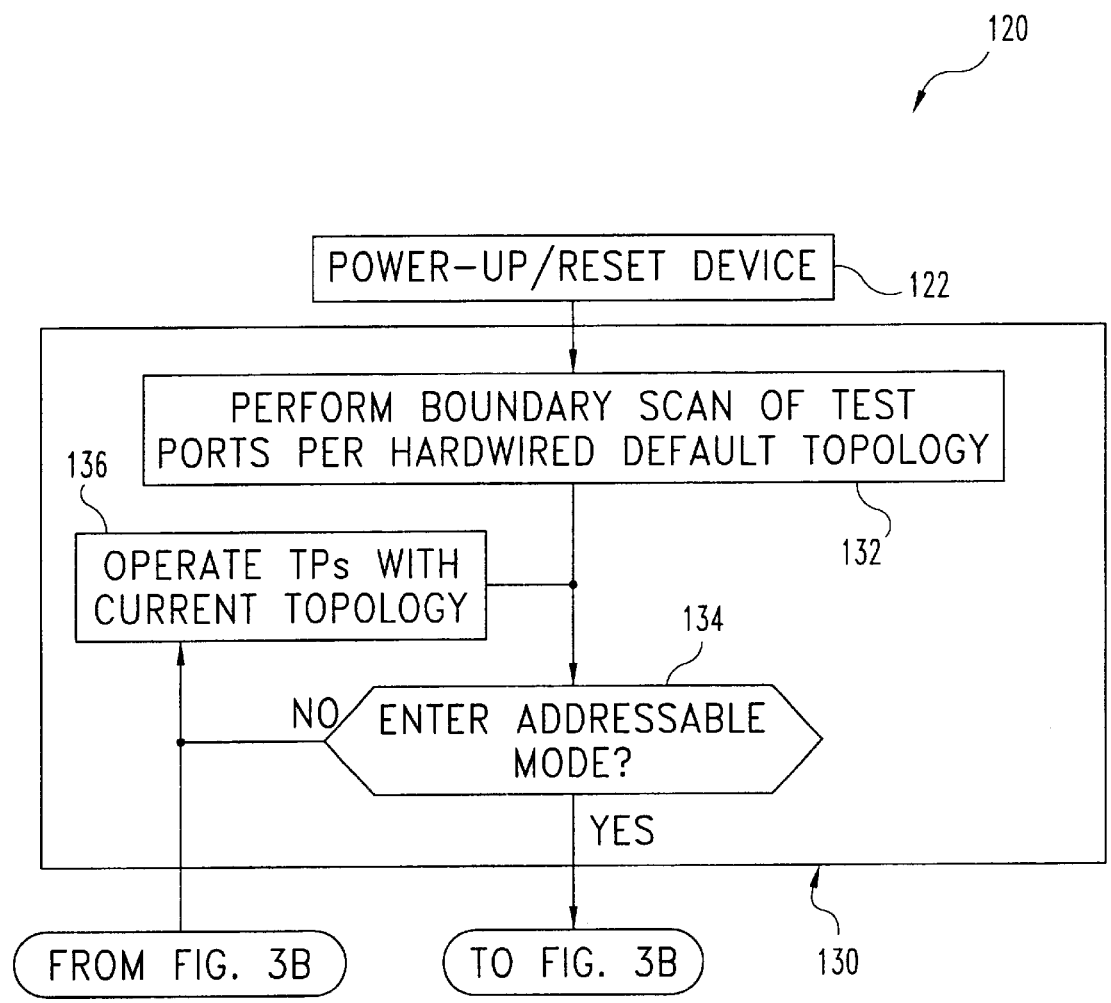
FIGS. 3A and 3B collectively provide a flowchart illustrating a routine of one embodiment of the present invention that can be executed with the system of FIG. 1.
Figure 3B:
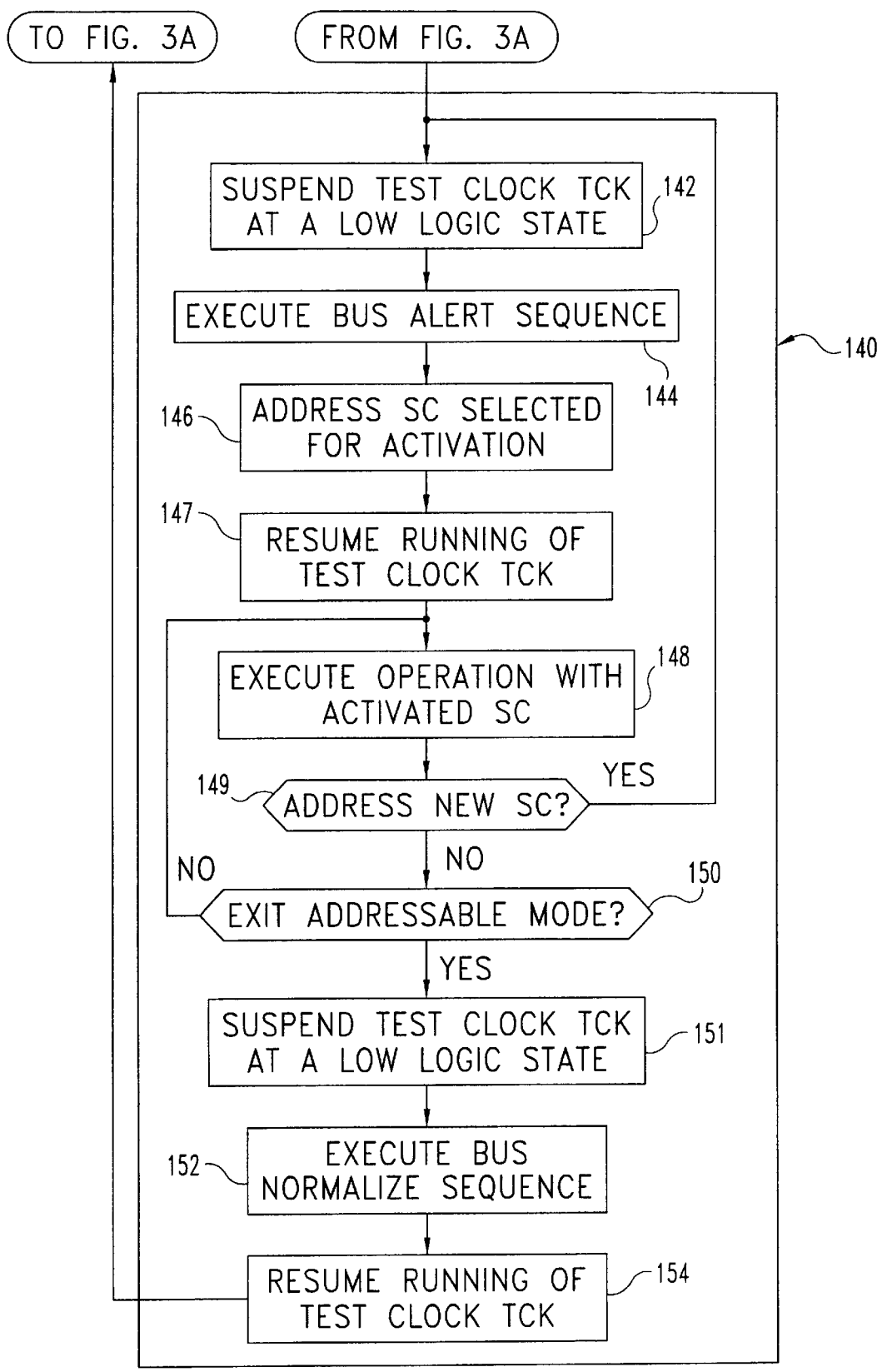

The flowchart of FIGS. 3A and 3B illustrates routine 120 of one embodiment of the present invention that can be executed with system 20. Referring to FIG. 3A, in stage 122 of routine 120, device 22 is powered-up or is reset in a standard manner. The reset operation can be performed with equipment 50 by changing state of bus line 46 in accordance with the optional TRST signal of the JTAG standard. Stage 122 initializes device 22 and equipment 50 in an TP active operating mode 130. In mode 130, all SCs 60 are configured to effectively connect TPs 70 through corresponding SCs 60 to test bus 40 in accordance with a hardwired, default topology. Typically, this topology includes most if not all of TPs 70 in a serial scan chain. During mode 130 operation, SC 60s are transparent to the operations of TPs 70 connected to test bus 40 in accordance with the default topology, such that memory and registers of SC 60 are inaccessible by test bus 50, being in a hidden, shadow operating arrangement. In stage 132 of mode 130, a boundary scan test is performed with the TPs 70 connected to test bus 40 in the default topology.

Conditional 134 tests whether to change operating modes. If the test of conditional 134 is negative, TPs 70 are operated in stage 136 under the control of equipment 50 using the current test access port topology. Stage 136 provides for standard JTAG operation of TPs 70 to verify proper manufacture and operation of device 22, while each SC 60 continue to be transparent to test bus operations. The execution of stage 136 can include operator input via input device(s) 50a and/or output to an operator via output device(s) 50b, with a number of different operational parameters or options. Stage 136 loops back to conditional 134 after execution; however, it should be understood that the execution loop of conditional 134/stage 136 loop is merely descriptive of one illustrative form of the present invention. In other embodiments, stage 136 could idle upon completion with conditional 134 being embodied as a program or operator input. For example, conditional 134 could be embodied as a operator-selected option provided by programming of equipment 50. In one form, operator input could be provided with a Graphical User Interface (GUI) button, menu, or check box. Alternatively or additionally, conditional 134 could be dependent upon the results of execution of another stage and/or be embodied in other ways as would occur to one skilled in the art.

If the test of conditional 134 is affirmative, then mode 130 is terminated and SC operating mode 140 begins with stage 142 of routine 120 as shown in FIG. 3B. In stage 142, test clock TCK on bus line 42 is suspended at a low logic level by equipment 50. Under the JTAG standard, when test clock TCK is clamped at a low logic level, operation of JTAG compliant TAPs is also suspended. Accordingly, by halting the test clock of test bus 40, operation of each TP 70 is halted.

Figure 4:
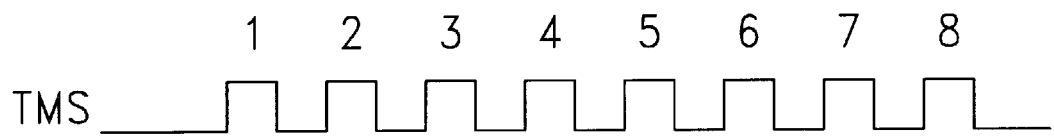
FIGS. 4–6 are timing diagrams relating to various operations of the routine of FIG. 3.
Figure 4:
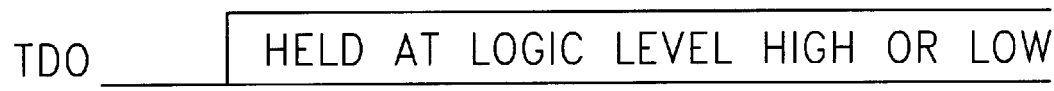
Figure 4:

Routine 120 proceeds from stage 142 to stage 144 to activate a signal protocol to access SCs 60. This signal protocol is hidden from the operation of test bus 40 in accordance with the JTAG standard due to continued suspension of test clock TCK at a low logic level. For this hidden signal protocol, the test mode select signal TMS is toggled to provide control signals and to clock information into and out of SCs 60. Referring additionally to the timing diagram of FIG. 4, a Bus Alert Sequence (BAS) is illustrated in which the test clock TCK is clamped low and the TDO signal is held at a constant high or low logic level while test mode select signal TMS is toggled between a high and low logic level eight times (cycles). The BAS is performed in stage 144 to prompt each SC 60 to monitor test bus 40 for further information.

Figure 5:
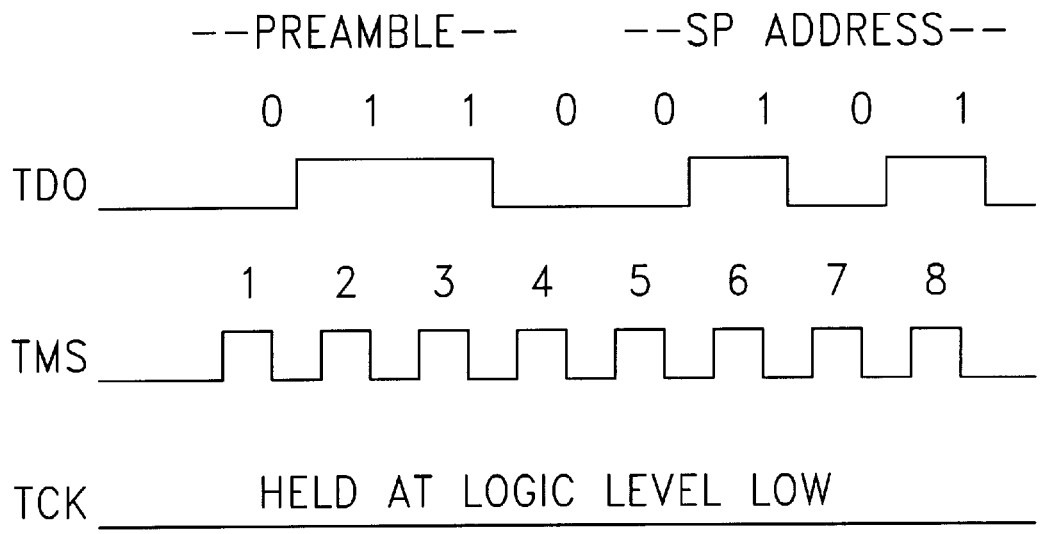

Routine 120 proceeds from stage 144 to stage 146. Stage 146 corresponds to the selection of one of SCs 60. Under the hidden signal protocol, each SC 60 is assigned a unique address. After the BAS of stage 144, SC addressing is provided by: (a) maintaining test clock TCK at a low logic level, (b) toggling TMS to operate as a clock relative to logic state changes of the TDO signal, and (c) changing state of TDO to communicate the unique address with clocking by TMS. FIG. 5 provides one example of an addressing sequence for SC selection, in which an addressing preamble of 011 in binary and an address of 00101 in binary (5 in base ten) is sent in eight TMS cycles. This example selects the SC with an address of five, providing addressability of up to 32 SCs with the five bit address portion of the sequence. The TDO information is serially communicated from equipment 50 to each SC 60 in a chain fashion in stage 146.

The addressed SC 60 is placed in a fully active state through the performance of stage 146, while the other SCs 60 remain in a bus alert state. Once addressing is performed in stage 146, operation of test clock TCK is resumed in stage 147. The addressed SC 60 recognizes test clock TCK, operating as a TAP under the JTAG standard in stage 148, while all the SCs 60 in a bus alert mode continue to ignore test clock TCK and all TPs 70 (including those associated with the active SP 60) remain suspended. Accordingly, for stage 148 the activated SC 60 is the only operational TAP controller, facilitating debug and special testing of SoC 34. An optional command under the JTAG standard also provides a vehicle for altering the topology of the TPs 70 subordinate to the active SC 60 during stage 148. In one nonlimiting example where SC 60 of SoC 34 activated, map register 64 can be loaded using this optional command. For the three TAPs 72a, 72b, 72c of SoC 34, mapping of different TAP topologies with register 64 can be in accordance with Table I as follows:

TABLE I

| Map Register Value | Test Port or Serial Test Port Chain Specified |
|---|---|
| 0 × 01 | TAP 72a |
| 0 × 02 | TAP 72b |
| 0 × 03 | TAP 72a serially connected to TAP 72b |
| 0 × 04 | TAP 72c |
| 0 × 05 | TAP 72a serially connected to TAP 72c |
| 0 × 06 | TAP 72b serially connected to TAP 72c |
| 0 × 07 | TAPs 72a, 72b, and 72b serially connected in that order |

In Table I, the value in the leftmost column is stored in map register 64 to define one of the subordinate TPs 70 of the activated SC 60 of SoC 34 or a serially connected chain of two or more of these subordinate TPs 70. Correspondingly, in this embodiment, seven different topologies for TAP 72a, TAP 72b, and TAP 72c (the subordinate TPs 70 of SoC 34), can be specified. Upon a power-up or reset condition, each SC 60 includes a hardwired value that is loaded into map register 64 to provide the corresponding power-up/reset default topology of TPs 70. Typically, this default topology would concatenate all TPs, corresponding to 0×07 from Table I.

From stage 148, routine 120 continues with conditional 149. Conditional 149 tests whether a new SC 60 is to be addressed and consequently activated. If a different SC 60 is to be activated, routine 120 loops back to repeat stages 142, 144, 146, 147, and 148. If the test of conditional 149 is negative, routine continues with conditional 150. Conditional 150 tests if mode 140 is to remain active. If the test of conditional 150 is affirmative, routine loops back to stage 148 to continue isolated operation of the activated SC 60 under mode 140. If the test of conditional 150 is negative, routine 120 proceeds to return to mode 130. Conditionals 149 and 150 can be implemented in any of the ways described in connection with conditional 134.

Figure 6:
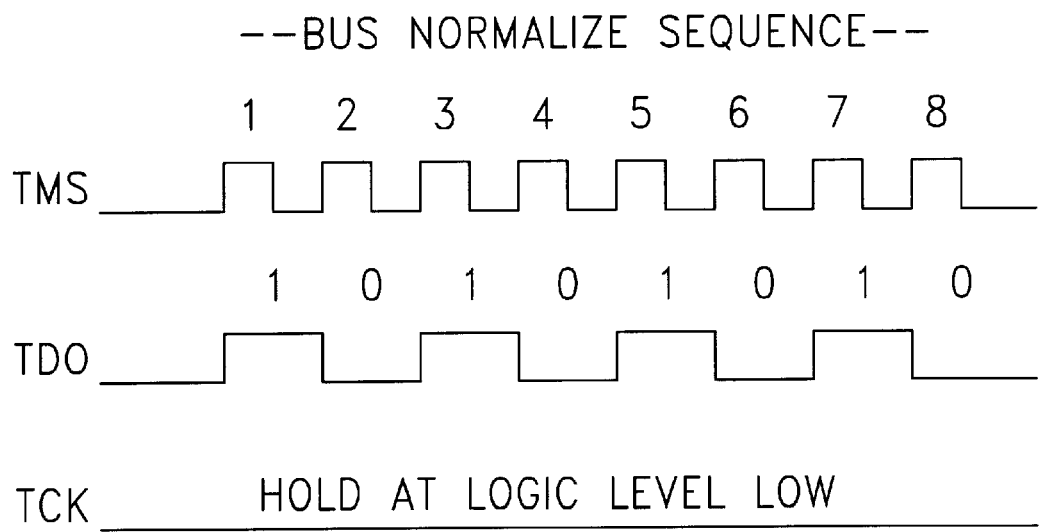

The return to mode 140 begins with suspension of test clock TCK in stage 151 at a low logic level. During this suspension, a Bus Normalize Sequence (BNS) is sent on test bus 40 in stage 152. Referring additionally to FIG. 6, one example of a BNS is illustrated, which includes toggling TDO once for every two cycles of the TMS signal, with test clock TCK remaining clamped at a low logic level. In FIG. 6, the high level of TDO is represented by a binary "1" and the low level by a binary "0." TDO is provided to SCs 60 in a serial chain fashion through the corresponding inputs and outputs of components 30. Once the BNS is received, all SCs 60 return to the shadow mode of operation. In response to the BNS, any new test access port topology defined by map register 64 is implemented as described in Table I, provided there is no power-up or reset that returns routine 120 to stage 122, re-establishing the default topology.

Routine 120 proceeds from stage 152 to stage 154 to resume operation of test clock TCK on test clock bus line 42. With test clock TCK running, mode 130 is resumed with stage 136 (FIG. 3A). Once resumed, mode 130 is executed with any test access topology changes provided during mode 140. Stage 136 then proceeds to conditional 134 to again test whether a mode change is to take place. Thus, there is the option to select the same or a different SC 60 after re-entry into mode 140. Also, a single TP 70 or a serially-concatenated subset of TPs 70 subordinate to the activated SC 60 can be specified with mode 140. The ability to activate SC 60 as a JTAG TAP for a given device during mode 140 and/or the ability to define different topologies during mode 140 for implementation upon return to mode 130 can be desirable to perform specific tests, such as debugging operations associated with a processor or logic engine of a given one of components 30 of device 22. Equipment 50 can be arranged with programming and/or logic to execute such operations via test bus 40. Consequently, the test architecture of system 20 provided to perform testing with TPs 70 in mode 130 can also be utilized to perform testing with SCs 60 in mode 140 to enhance flexibility. It should be understood that for the illustrated embodiment, routine 120 returns to stage 122 from any stage or conditional in response to a power-up or reset, and further that routine 120 continues to operate until it is desired to stop control of device 22 with equipment 50. Also, it should be understood that there are three possible stages of SC 60 as illustrated in the first column of Table II below. The entry conditions and exit conditions for these SC 60 states are shown in the second and third columns of Table II, respectively, as follows:

TABLE II

| SC State | Entry Conditions | Exit Conditions |
|---|---|---|
| Bus Alert (During mode 140) | Bus Alert Sequence | Hardware Reset Address Sequence Bus Normalize Sequence |
| Active/Addressed (During mode 140) | Address Sequence | JTAG De-Activate Command |
| Shadow (During mode 130) | Hardware Reset JTAG De-Activate Command Bus Normalize Sequence | Bus Alert Sequence |

Many alternative embodiments of the present invention are contemplated. For example, in other embodiments, a different arrangement of more or fewer components with an SC 60 and/or more or fewer TPs 70 per SC 60 are utilized. In another embodiment, the established test protocol utilized in mode 130 can deviate from the JTAG standard. In still another embodiment, different standards and/or signal protocols can be used to change topologies of a group of test ports through a shadow controller that may or may not be JTAG compatible. These alternatives can include, but are not limited to, different values and/or sequences for the hidden signal protocols established with the test mode select TMS and test data out TDO while the test clock TCK is suspended. In a further alternative embodiment, a process in accordance with the present invention need not include performance of a boundary scan test upon power-up or test logic reset. Indeed, test logic reset (TRST) aspects may be absent in alternative JTAG-based embodiments. A further alternative provides a combination of test ports (TAPs) that are compliant with the JTAG standard and one or more test ports that are not compliant with the JTAG standard, where such test ports are each subordinate to a corresponding shadow controller. For this alternative, access and/or operation of a noncompliant test port could be provided during activation of its corresponding shadow controller under a hidden protocol invisible to JTAG operation. Alternatively or additionally, a shadow controller can be arranged to perform noncompliant testing, debugging, or other operations when in an active mode that is invisible to JTAG operation. Further embodiments of the present invention include one or more software programs stored on a processor-readable device excecutable by one or more of the processor(s) 52 of equipment 50 or other equipment according to the present invention; where such execution performs some or all of the aspects of routine 120 or another routine, process, or procedure in accordance with the present invention.

Any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. A method, comprising
   providing a device responsive to a test clock, the device including a first test controller and a second test controller;
   operating the first test controller while the second test controller is inactive;
   establishing a suspension of the test clock to activate the second test controller; and
   operating the second test controller.

2. The method of claim 1, wherein the first test controller is inactive during operation of the second test controller and further comprising running the test clock during the operation of the second test controller.

3. The method of claim 2, wherein the second test controller is coupled between the test bus and the first test controller and is in the form of a shadow controller that is inactive during operation of the first test controller.

4. The method of claim 3, wherein the first test controller and the second test controller each operate in accordance with a JTAG standard and further comprising executing a boundary scan with the test ports arranged in serial chain upon power-up or reset of the device.

5. The method of claim 1, wherein the second test controller is one of a number of shadow controllers each included in a different device and the shadow controllers are each uniquely addressable by one or more signals over the test bus during the suspension.

6. The method of claim 1, wherein the device includes a shadow controller coupled to the test bus, the first test controller and the second test controller each being included in a corresponding test port subordinate to the shadow controller, and which further includes changing test port topology from a first configuration to a second configuration with the shadow controller after the suspension, the first configuration corresponding to said operating the first test controller while the second controller is inactive, the second configuration corresponding to said operating the second test controller.

7. The method of claim 1, which further includes:
   running the test clock during operation of the second test controller; and
   suspending the test clock to halt the operation of second test controller; and
   resuming running of the test clock after said suspending to operate the first test controller.

8. The apparatus of claim 1, wherein:
   the test bus includes a serial data out path, a serial data in path, a test clock path, and a test mode selection path;
   the established test standard is the JTAG standard, the serial data out path corresponds to a TDO bus line of the JTAG standard, the serial data in line corresponds to a TDI bus line of the JTAG standard, the test clock path corresponds to the TCK bus line of the JTAG standard, the test mode selection path corresponds to the TMS bus line of the JTAG standard; and
   a circuit device includes the test bus, the test ports, and the first shadow controller, and further comprising equipment coupled to the test bus.

9. An apparatus, comprising:
   a test bus;
   several test ports each including a controller, the test ports being operable in accordance with an established standard during a first mode of operation; and
   a first shadow controller coupled between the test bus and the test ports, the first shadow controller including a storage device to store information corresponding to a selection of one or more of the test ports during a second mode of operation, the test ports being inactive during the second mode of operation, the one or more of the test ports selected with the information being operable in accordance with the established test standard upon return to the first mode of operation, the first shadow controller being inactive during the first mode of operation.

10. The apparatus of claim 9, further comprising a second shadow controller coupled between the test bus and two or more other test ports, the first shadow controller and the second shadow controller each being uniquely addressable during the second mode of operation.

11. The apparatus of claim 9, wherein the test bus is operable to provide a test clock signal, and the first shadow controller is responsive to a suspended state of the test clock signal to transition between the first mode of operation and the second mode of operation.

12. The apparatus of claim 9, wherein a circuit device includes the test bus, the test ports, and the first shadow controller and further comprising bus master means for testing and debugging the device, the bus master means being coupled to the test bus.

13. The apparatus of claim 12, wherein the storage device is in the form of a register accessible by test equipment.

14. An apparatus, comprising: a processor-readable device encoded with a plurality of processor instructions executable to: perform a boundary scan test through a serially concatenated chain of several test access ports in accordance with an established test bus protocol, halt a test clock signal to suspend operation of the test access ports, and operate the shadow controller during suspension of the test access ports.

15. The apparatus of claim 14, wherein the instructions are further operable to store information in a storage device of the shadow controller to provide a different configuration of the test access ports, and operate the different configuration of the test access ports in accordance with the established test bus protocol after the shadow controller is deactivated.

16. The apparatus of claim 15, wherein the processor-readable device is in the form of a portable, nonvolatile storage device.

17. The apparatus of claim 16, wherein the storage device includes at least one of an electromagnetic storage disk and an optical storage disk.

18. The apparatus of claim 15, further comprising test equipment including one or more processors operable to access the processor-readable device and execute the processor instructions to test a device coupled to the test equipment by a test bus.

19. The apparatus of claim 18, wherein the established test bus protocol corresponds to a JTAG standard and the test clock signal corresponds to a TCK signal of the JTAG standard.

20. A method, comprising:

providing a circuit device with several test ports operating in a first topology in accordance with an established test standard;

suspending operation of the test ports to establish a second topology of one or more of the test ports with a shadow controller coupled to a test bus; and operating the one or more of the test ports of the second topology in accordance with the established test standard after said suspending, the shadow controller being inactive during said operating.

21. The method of claim 20, wherein said suspending includes establishing suspension of a test clock signal on the test bus and further comprising:

activating the shadow controller during said suspending to operate in accordance with the established test standard; and deactivating the shadow controller during said suspending.

22. The method of claim 20, wherein the first topology corresponds to a serially connected chain of the test ports and fewer test ports participate in the second topology than the first topology.

23. The method of claim 20, wherein the circuit device includes the test bus and the shadow controller, and which further includes selecting the second topology to debug the circuit device.

24. The method of claim 20, wherein said suspending and said operating are performed in accordance with programming of equipment coupled to the test bus and the established test standard corresponds to a JTAG standard.

25. A method, comprising:

halting a test clock to suspend operation of several test ports;

operating a shadow controller while the test ports are suspended; and resuming operation of one or more of the test ports after said operating.

26. The method of claim 25, further comprising running the test clock during said operating while the test ports remain suspended.

27. The method of claim 25, wherein the shadow controller is coupled to a test bus providing the test clock and at least a portion of the test ports are coupled to the shadow controller.

28. The method of claim 25, wherein the shadow controller and the test ports are operable in accordance with a JTAG standard.

* * * * *